United States Patent [19]

Barder

[11] Patent Number: 5,011,822
[45] Date of Patent: Apr. 30, 1991

[54] PREPARATION OF A UNIFORM MIXED METAL OXIDE AND SUPERCONDUCTIVE OXIDES

[75] Inventor: Timothy J. Barder, Addison, Ill.

[73] Assignee: Allied-Signal Inc., Morris Township, Morris County, N.J.

[21] Appl. No.: 296,267

[22] Filed: Jan. 10, 1989

[51] Int. Cl.$^5$ .................. C01F 1/00; C01F 17/00; C01G 1/00

[52] U.S. Cl. .................................. 505/1; 423/593; 423/594; 423/599; 423/600; 423/604; 423/605; 423/618; 423/632; 423/635; 423/263; 423/265; 501/123; 501/152; 502/355; 502/525; 252/521; 505/738; 505/742; 505/778; 505/779; 505/780; 505/781

[58] Field of Search .............. 423/593, 594, 604, 595, 423/263, 596, 265, 598, 635, 632, 641, 625, 624, 622, 619, 618, 617, 608, 606, 605, 603, 601, 600, 599; 501/123, 152; 252/521; 502/355, 525; 505/346, 728, 742, 778, 779, 780, 781

[56] References Cited

U.S. PATENT DOCUMENTS

| | | | |
|---|---|---|---|
| 3,975,290 | 8/1976 | Anderson | 252/301.1 R |
| 4,421,671 | 12/1983 | Cusano et al. | 252/301.4 F |
| 4,696,810 | 9/1987 | Shirasaki et al. | 423/593 |
| 4,863,521 | 9/1989 | Block | 423/593 |
| 4,874,598 | 10/1989 | Oda et al. | 423/598 |
| 4,900,536 | 2/1990 | Snyder et al. | 423/593 |

OTHER PUBLICATIONS

Caponell et al., App. Phys. Lett. 50(9) Mar. 2, 1987, "Super Critical Fields and High Superconducting Transition Temperatures of La1.85 Sr0.15 CuO4 and La1.85 Ba0.15 CuO4", pp. 543–544.

Kaneko et al., Japanese Journal of Applied Physics, vol. 26, No. 5, May, 1987, "On the Coprecipitation Method for the Preparation of High TcM-X-Cu-O(M=Ba, Sr, X=La$_1$Y) System", pp. L734–735.

Cava et al., Physical Review Letters, vol. 58, No. 16, Apr. 20, 1987, "Bulk Superconductivity at 91K in Single-Phase Oxygen-Deficient Perovskite Ba$_2$YCu$_3$O$_{9-\delta}$", pp. 1676–1679.

Hirabayashi et al., Japanese Journal of Applied Physics, vol. 26, No. 4, Apr. 1987, "Structure and Superconductivity in a New Type of Oxygen Deficient Perovskites Y$_1$Ba$_2$Cu$_3$O$_7$", pp. L454–L455.

Bednorz et al., Mat. Res. Bull., vol. 18, 1983, "Phase Diagram of the (LaAL0$_3$)$_{1-x}$(SrTiO$_3$)$_x$ Solid-Solution System, for X$\leq$0.8", pp. 181–187.

Kawai et al., Japanese Journal of Applied Physics, vol. 26, No. 5, May 1987, "Preparation of High Tc-Y-Ba-Cu-O Superconductor", pp. L736–L737.

Uchida et al., Japanese Journal of Applied Physics vol. 26, No. 1, Jan. 1987, "High Tc Super Conductivity of La-Ba-Cu Oxides", pp. L1–L2.

Bednorz et al., Z. Phys. B. Condensed Matter 64 1986, "Possible High Tc Superconductivity in the Ba-La-Cu-O System", pp. 189–193.

American Chemical Society, vol. 26, No. 10, 1987, "Comparison of Carbonate, Citrate, and Oxalate Chemical Routes to the High Tc Metal Oxides Superconductors La$_{2-x}$Sr$_x$CuO$_4$", pp. 1474–1476.

Wang et al., Solid State Communications, vol. 64, No. 6, 1987, "The Oxalate Route to Superconducting YBa$_2$Cu$_3$O$_{7x}$", pp. 881–883.

Moodenbaugh et al., "Preparation of YBa$_2$Cu$_3$O$_2$ and Related Compounds", pp. 101–102, Mrs. 1987.

Wu et al., Physics Review Letters, 58, 908 (1987).

Moure et al. Br. Ceram. Proc., 40 (Supercond. Ceram), 237–242, "Low Temperature Thermal Expansion of High Tc Superconductor Phase Y$_1$Ba$_2$Cu$_3$O$_{7-\delta}$, Prepared by Oxalate Precursors".

Primary Examiner—Robert L. Stoll
Assistant Examiner—Paige C. Harvey
Attorney, Agent, or Firm—Harold N. Wells; Gerard P. Rooney

[57] ABSTRACT

A method for producing uniform mixed metal oxides, such as superconducting mixtures including Y$_1$Ba$_2$Cu$_3$O$_{7-x}$, in which such metals are precipitated as their oxalates from alcoholic solutions of the metals as the salts of a carboxylic acid.

10 Claims, 7 Drawing Sheets

PREPARATION OF A UNIFORM MIXED METAL OXIDE AND SUPERCONDUCTIVE OXIDES

BACKGROUND OF THE INVENTION

This invention relates generally to the preparation of uniform mixed metal oxides, which are important in certain advanced ceramics applications. One current topic of great interest is the preparation of copper oxide-based superconducting materials, particularly a composition containing yttrium, barium, and copper. Chu and coworkers reported the discovery of a new material based on the starting composition $Y_{1.2}Ba_{0.6}CuO_y$ with a superconducting temperature well above 90° K. See, *Physics Review Letters*, 58, 908 (1987). However, only a fraction of this sample was actually superconducting, and the superconducting fraction was identified as an oxygen defect perovskite corresponding to the composition $YBa_2Cu_3O_y$.

The synthesis of these new superconductors follows standard methods previously described for perovskite oxides. This involves intimately mixing the oxide or the carbonate powders and calcining at temperatures ranging from 900° to 1000° C. For example, to obtain $YBa_2Cu_3O_y$, ultrapure $Y_2O_3$, $BaCO_3$ and CuO powders are mixed in a ball mill in an atomic ratio of Y/Ba/Cu of 1/2/3. After extensive milling, the powder is heated in an alumina boat at 950° C. under flowing oxygen for 12 hours. The resulting black powder is remilled and heated again under similar conditions to give the desired phase.

Reaction of the components occurs by solid state diffusion of the yttrium, copper and barium ions at high temperature. Since the mobility of these ions is limited to relatively short distances, extensive milling is required to give as homogeneous a mixture as possible. However, achieving a homogeneous mixture of the material on a microscopic scale is extremely difficult. On a commercial scale the milling of metal compound powders could be expected to be cumbersome, if not practically impossible, and consequently, another method capable of providing homogeneous mixtures would be desirable.

Homogeneity of superconducting materials is very important because the maximum amount of current, i.e. critical current, which the superconducting material can conduct is a function of the homogeneity and microstructure of the material. Additionally, the homogeneity and the microstructure of these superconducting materials affects the ability of these materials to be fabricated into useful structures such as wires, coatings or tapes.

In copending application, U.S. Ser. No 07/306,233 the coprecipitation of metal oxide precursors from aqueous solutions of their salts by addition of oxalic acid was shown to make possible the preparation of superconducting compositions. Such a method could be used on a commercial scale.

More recently, it has been found that some of the barium remains in the aqueous solution during the precipitation of the metal oxalates when the nitrates are used as starting materials. This may be attributed to the formation of nitric acid as the metal nitrate is precipitated as the metal oxalate. As a result the ratio of the metals initially dissolved is not identical with that in the precipitated mixture. In addition, the chemical composition of the precipitates is not perfectly uniform and barium tends to be segregated.

Peng Ding-Kun et al. show that in aqueous solutions the pH should be controlled and acetate salts should be used to control the composition of the precipitate. They report that barium in particular remains in solution rather than being fully precipitated.

Moure et al. in *Br. Ceram. Proc.*, 40 (Supercond. Ceram.), 237–42, discuss the product obtained when Y, Ba, Cu nitrates were precipitated by oxalic acid dissolved in ethanol. The nitrate precursors were said to have been dissolved in an ethanol-water solution, presumably because the nitrates are not soluble in ethanol, but require the presence of water.

Consequently, we have sought improved methods which provide superior superconducting compositions. However, these methods are not limited to preparing superconducting compositions but are more generally applicable to those situations where extremely uniform mixtures of metal oxides are wanted.

The instant invention provides an improved method of manufacturing a uniform mixed metal oxide such as a superconducting material by coprecipitating insoluble solids of the desired components from a particular medium, then drying and calcining said solids. This process provides materials that are intimately mixed at room temperature without having to rely on milling or high temperature diffusion techniques. It has been found that by proper selection of the initial metal precursors and the precipitating medium that the resulting precipitate decomposes to a metal oxide mixture at a temperature up to 100° C. lower than obtained by prior art precipitation methods, which indicates that a more uniform mixed metal oxide has been produced. Where a superconducting compound is sought, a greater fraction of the precipitate is converted to a superconducting material.

SUMMARY OF THE INVENTION

In general, the invention is a method for producing a uniform mixed metal oxide comprising dissolving predetermined ratios of the metals as salts of a carboxylic acid in an aliphatic alcohol in the substantial absence of water, then precipitating said metals as their oxalates by mixing the metals solution with oxalic acid, and thereafter separating the precipitated metal oxalates and calcining above about 500° C. to convert the oxalates to the corresponding metal oxides.

In one aspect, the invention relates to a method of preparing a uniform mixed metal oxide which includes at least two metals selected from (a) the lanthanides including La, (b) the alkaline earths including Mg, Ca, Sr, Ba, and Ra, (c) the actinides including Ac, (d) the transition metals including Y, Hg, Pb, Ag, Zn, Al, Cd, Co, Fe, Ni, Pd, Pt, Sc, Au, and Cu. The selected metal oxide precursors are precipitated from an alcoholic solution of their metal acetates by addition of a nearly stoichiometric amount of oxalic acid, recovering and drying the insoluble solids, heating the dried insoluble solids at a temperature above about 500° C., in an oxidizing atmosphere and recovering the uniform mixed metal oxide.

One embodiment of the invention comprises a method of preparing a uniform mixed metal oxide which is a superconductor, comprising the steps of adding to an alcoholic solution of yttrium, barium, and copper acetates in the appropriate atomic ratios a nearly stoichiometric amount of oxalic acid. The resultant precipitate is isolated, dried and calcined at a temperature of about 850° C. to yield a powder having the empirical formula $YBa_2Cu_3O_{7-x}$.

DETAILED DESCRIPTION OF THE INVENTION

Figure 1:
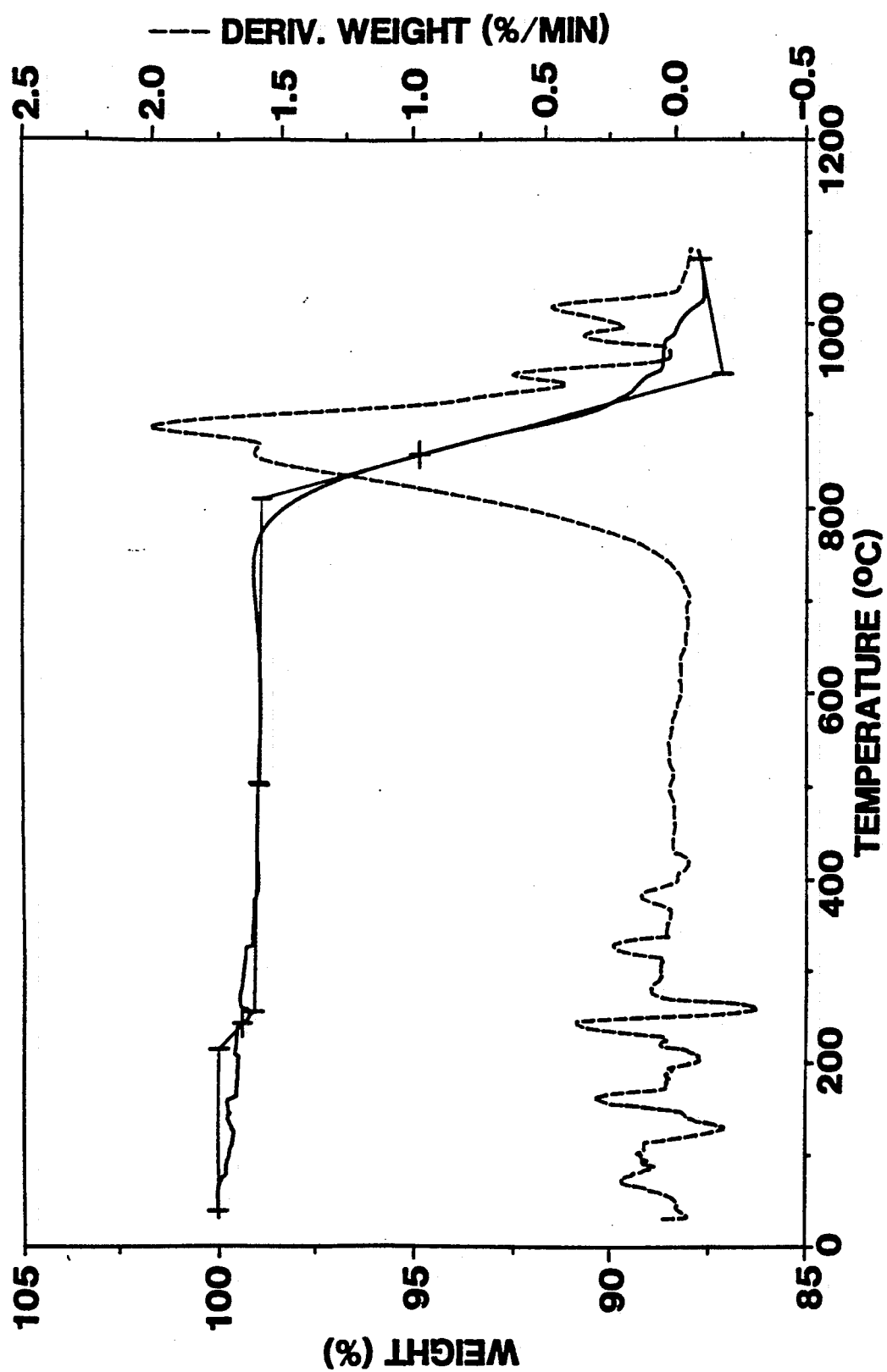
FIG. 1 is a thermogravimetric plot (TGA) showing the effect of heating a precipitate according to the invention.

The present invention relates to an improved method of preparing a more uniform mixed metal oxide which permits calcination at temperatures up to 100° C. lower than prior art precipitation methods. Broadly, such mixtures may include at least two metals selected from the (a) the lanthanides, (b) the alkaline earths, (c) the actinides, and (d) the transition metals. The lanthanides will include La and the actinides will include Ac. The alkaline earths will include Mg, Ca, Sr, Ba, and Ra. The transition metals will include Y, Hg, Pb, Ag, Zn, Al, Cd, Co, Fe, Ni, Pd, Pt, Sc, Au, and Cu. These metals form insoluble precipitates when their precursors are contacted with oxalic acid. A specific embodiment is the superconducting composition having the nominal formula $Y_1Ba_2Cu_3O_{7-x}$.

The term "uniform mixed metal oxide" is defined for the purposes of this application as a material which is chemically homogeneous on a microscopic scale. Chemical homogeneity may be determined by examining the material with a scanning electron microscope (SEM) or a scanning transmission electron microscope (STEM). These instruments can determine the composition of particles as small as 50 Angstroms (15 Angstroms for STEM). If homogeneity is observed for a large portion of the sample, then the material may be classified as chemically homogeneous. It should be understood that the present invention discloses an improved method as compared with prior art precipitation methods. This improved method is believed to provide an even more uniform mixed metal oxide, but this may or may not be evident from microscopic inspection. However, those skilled in the art will recognize that the lower calcination temperature infers that a more uniform mixture has been produced.

Generally, insoluble solids of the desired metals are coprecipitated by mixing a solution of the compounds of the desired metals with a nearly stoichiometric amount of a precipitating compound. In copending application U.S. Ser. No. 07/306,233 an excess of the precipitating compound was preferred in order to control the pH in the aqueous solutions. The compounds of the desired metals are present in said solution in a concentration such that the atomic ratio is the same as that of the final material. In the method of this invention the composition of the precipitate is closer to that of the original solution than when aqueous solutions of metal nitrates are used, such as is shown in the art. The precipitating compound, i.e., oxalic acid, is generally added as a solid to the metals solution. Once the insoluble solids are formed, they are isolated by conventional methods, dried, heated in air or oxygen and slowly cooled to room temperature to give a uniform mixed metal oxide. The drying and heating in air or oxygen steps may be combined and performed in one step.

The precipitate which is formed using the method of the instant invention contains the desired metals in the same atomic ratio as the final material. Additionally, this precipitate is extremely fine. Depending on the concentration of the metal compound solution and the precipitating compound solution the resultant precipitate may be characterized as a gel. A gel is defined as an aggregation of particles into small clusters such that a three dimensional structure is formed.

Although in copending application U.S. Ser. No. 07/306,233 metal nitrates were preferred and the solvent used was generally water, we have found that substantially improved results are obtained when metal acetates are dissolved in aliphatic alcohols and then precipitated by mixing with solid oxalic acid, substantially in the absence of water.

Aliphatic alcohols, such as methanol, ethanol, propanol and the like, particularly methanol, have been found to assist in producing a more uniform metal oxide mixture. As will be seen, the precipitates can be converted to the metal oxides at temperatures up to about 100° C. lower than is typical of prior art precipitation methods.

The solution which contains compounds of the desired metals is admixed with solid oxalic acid. An alcoholic solution of oxalic acid could be used but is not necessarily preferred. In contrast to the method of U.S. Ser. No. 07/306,233 only a nearly stoichiometric amount of oxalic acid is used, say up to about 5% excess, since in a water-free medium, control of pH is no longer a significant consideration.

With good mixing, the oxalic acid powder is continuously added to the solution of the desired metal compounds. Precipitation occurs after some delay and the precipitate is isolated by conventional techniques and dried at a temperature of about 50° to about 100° C. and lightly ground to produce a flowable powder. This powder may now be converted to the uniform mixed metal oxides by calcining in air or flowing oxygen at a temperature above about 500° C. for a period of time of about 1 to about 24 hours. However, it is a feature of this method that lower temperatures are needed as compared with prior art precipitation techniques. In particular, a temperature of about 850° C. has been found sufficient when calcining a Y, Ba, Cu precipitate. After the calcination the powder is slowly cooled to room temperature. Materials having the empirical formula $YBa_2Cu_3O_{7-x}$ prepared according to the method of the instant invention are superconducting at temperatures as high as 93° K.

In a preferred method of preparation, where yttrium, barium and copper are the desired components, acetate salts of all three of the components are dissolved in methanol in an atomic ratio of Y:Ba:Cu of 1:2:3. Addition to this solution of oxalic acid powder will precipitate an intimate mixture of the oxalates of yttrium, barium and copper.

It is preferred to precipitate the components at ambient temperature and pressure, but other conditions may be used. For example, a solution of yttrium acetate, barium acetate and copper acetate in methanol may be heated to 60° C. and oxalic acid powder added. The precipitate which is formed is isolated and processed as described above.

Since the method of preparation of the instant invention does not involve any grinding, the resultant material does not contain any impurities such as silica, alumina, iron, chromium, zirconia or tungsten which are derived from a grinding medium. Contamination of the material by the milling medium is a disadvantage of the prior art process. We have found that ball milling a mixture of $Y_2O_3$, $BaCO_3$ and CuO in a ceramic mill jar using alumina balls for 12 hours, as taught by the prior art, resulted in the superconducting material containing 0.35 weight percent aluminum. Since such impurities are not introduced by the method of manufacturing of the instant invention, the material produced by the instant invention has a higher purity than the material of the prior art. Thus, the instant method of preparation produces an article of manufacture which contains less than 0.1 weight percent of an oxide of an element which element includes aluminum, silicon, zirconium, iron, chromium and tungsten. Additionally, since the coprecipitation procedure results in a more intimate mixture of the various components, homogeneity from grain to grain is obtained in the final product.

Once the material is obtained, it may be further processed into any desired shape or form. For example, pellets of the superconducting material may be obtained by pressing or extruding the material. Additionally, wires may be produced by extrusion or rolling and the wires may in turn be formed into various shapes.

EXAMPLE 1

Comparative

Preparation of the oxalate precursor from the nitrate salts $Y(NO_3)_3.xH_2O$ (65.5 g, 0.15 moles), $Ba(NO_3)_2.xH_2O$ (82.9 g, 0.30 moles) an $Cu(NO_3)_2.xH_2O$ (107.10 g, 0.45 moles) were dissolved in 1500 cc of deionized $H_2O$ and heated until dissolution occurred. Oxalic acid (945.5 g, 7.5 moles) was dissolved in 7500 cc of deionized $H_2O$. Using a high shear mixer the hot nitrate solution was added to the oxalic acid solution rapidly with efficient mixing. The blue precipitate which forms immediately was stirred for approximately 1 hour, filtered using a basket type centrifuge and dried in an oven at 60° C. overnight. The resulting blue powder was lightly ground through a 60 mesh screen prior to any calcination.

EXAMPLE 2

Comparative

Preparation of the oxalate precursor from the acetate salts $Y(OAc)_3.xH_2O$ (59.53 g, 0.15 moles), $Ba(OAc)_2.xH_2O$ (79.23 g, 0.30 moles) and $Cu(OAc)_2.xH_2O$ (92.84 g, 0.45 moles) were added to 1500 cc of deionized $H_2O$ and heated until all the salts were dissolved. Oxalic acid (257.2 g, 2.0 moles) was dissolved in 2500 cc of deionized $H_2O$. The precipitation, consolidation, drying and grinding were carried out as in Example 1. Typical yields of the mixed metal oxalate precipitate for either reaction were 200 grams.

EXAMPLE 3

Preparation of oxalate precursor from acetate salts in methanol

The same proportions of the acetate salts as in Example 2 were added to 3000 cc of methanol and warmed until the salts dissolved. Solid oxalic acid (132.4 g, 1.05 moles) was added with rapid stirring and the resulting precipitate stirred for 1 hour. The consolidation and drying were carried out as in Example 1.

The improved results obtained with the preparation method of the invention are demonstrated in the figures which show that reduction of the precipitate to the metal oxides occurs at distinctly lower temperatures than when precipitates are prepared according to the prior art. Further the amount of the superconducting phase $YBa_2Cu_3O_{(7-x)}$ is significantly greater in yttrium-barium-copper precipitates.

Figure 2:
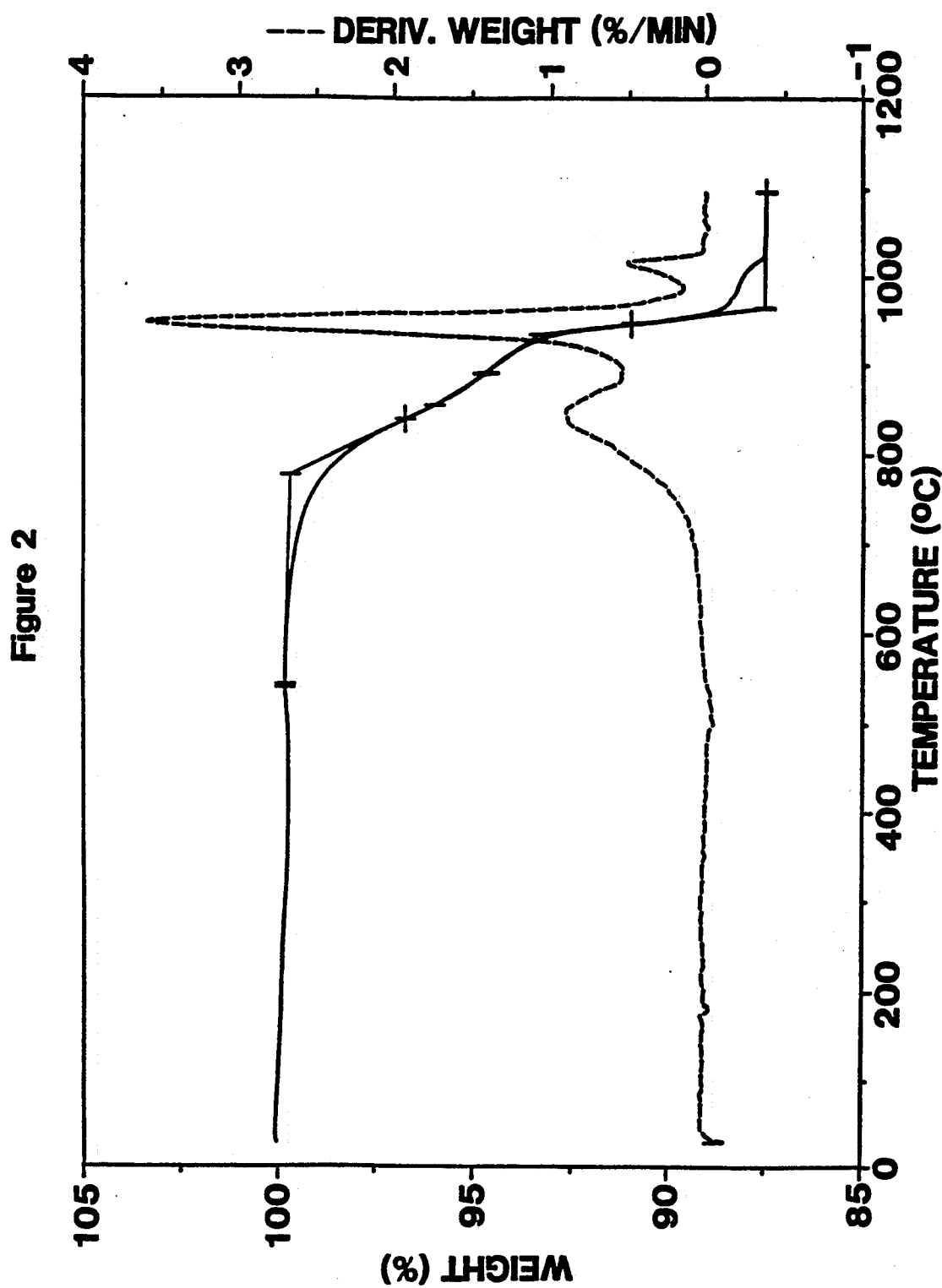
FIG. 2 is a TGA plot showing the heating of a precipitate from an aqueous solution of metal acetates.
Figure 3:
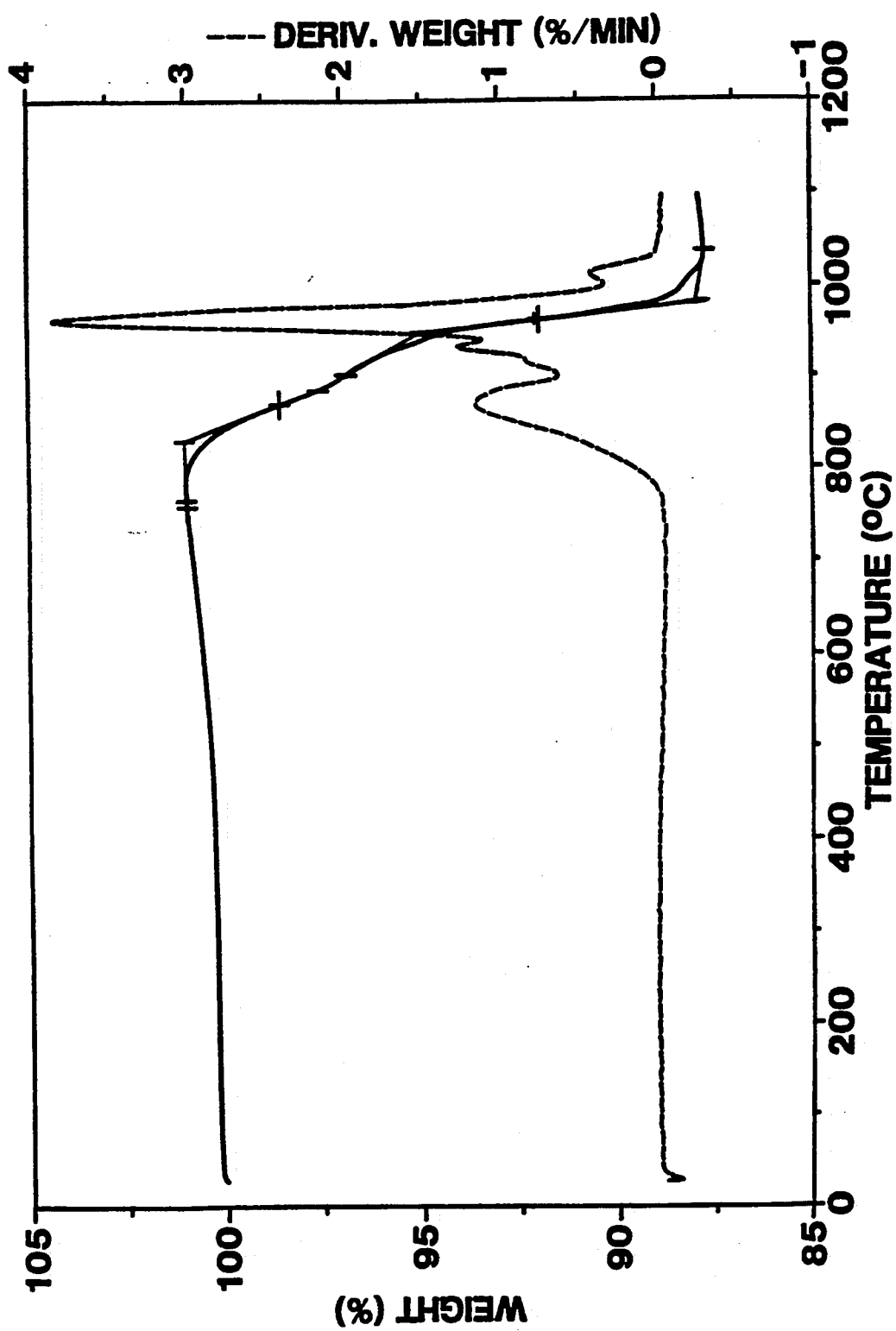
FIG. 3 is a TGA plot showing the heating of a precipitate from an aqueous solution of metal nitrates.
Figure 4:
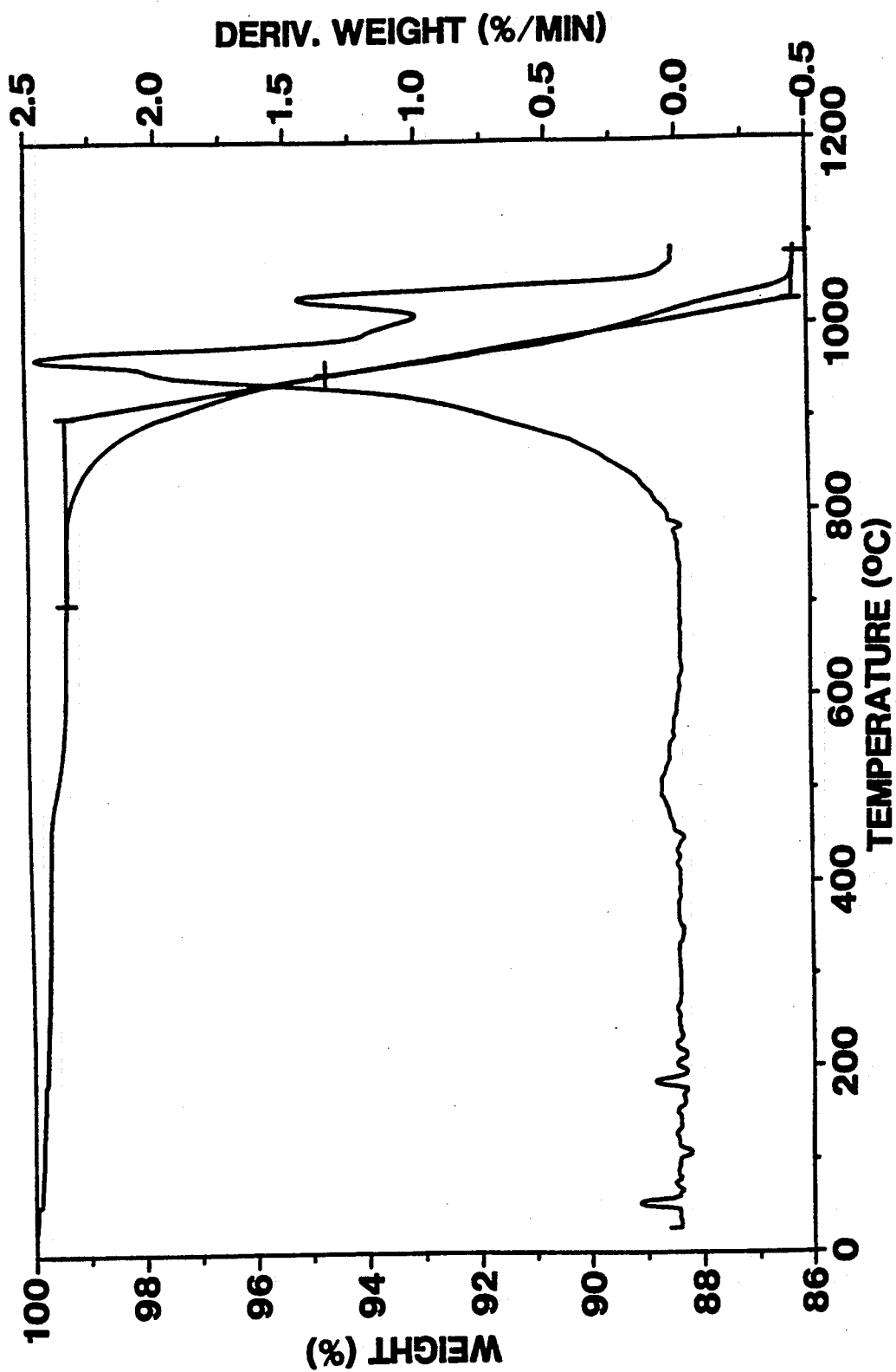
FIG. 4 is a TGA plot showing the heating of a ball-milled mixture of $BaCO_3$, $Y_2O_3$, and $CuO$.

The figures are of two types. FIGS. 1-4 are the product of a thermal gravimetric analysis (TGA) carried out in the equipment commercially available from the DuPont Company (DuPont Model No. 9900). FIG. 1 represents the method of the invention (Example 3). FIG. 2 represents the method of Example 2. FIG. 3 represents the method of Example 1. FIG. 4 represents the ball-milling method of the prior art. The samples had been previously heated to 600° C. in air for 6 hours and then cooled before testing. During gradual heating the sample undergoes physical and chemical changes with the total weight being shown by one curve and the rate of change in sample weight shown by the second curve. It will be seen that in more conventional processing (FIGS. 2 to 4) there is an increase in the rate of weight loss beginning at about 800° C. but that the maximum rate of weight loss appears to be about 950° C., which is consistent with the calcining temperature usually used in the prior art. Once past this peak, the sample loses essentially no weight. In FIG. 1 representing the method the invention, however, the weight loss curve is significantly different. The period of rapid weight loss begins at about 750° C. and reaches its maximum at 850°-900° C. By 950° C. the rate of weight loss has returned to the low level typical of the region below about 750° C. Thus, precipitates prepared according to the invention are concluded to permit lower temperature calcination than found with prior art precipitation methods or ball-milling of metal compounds.

Figure 5:
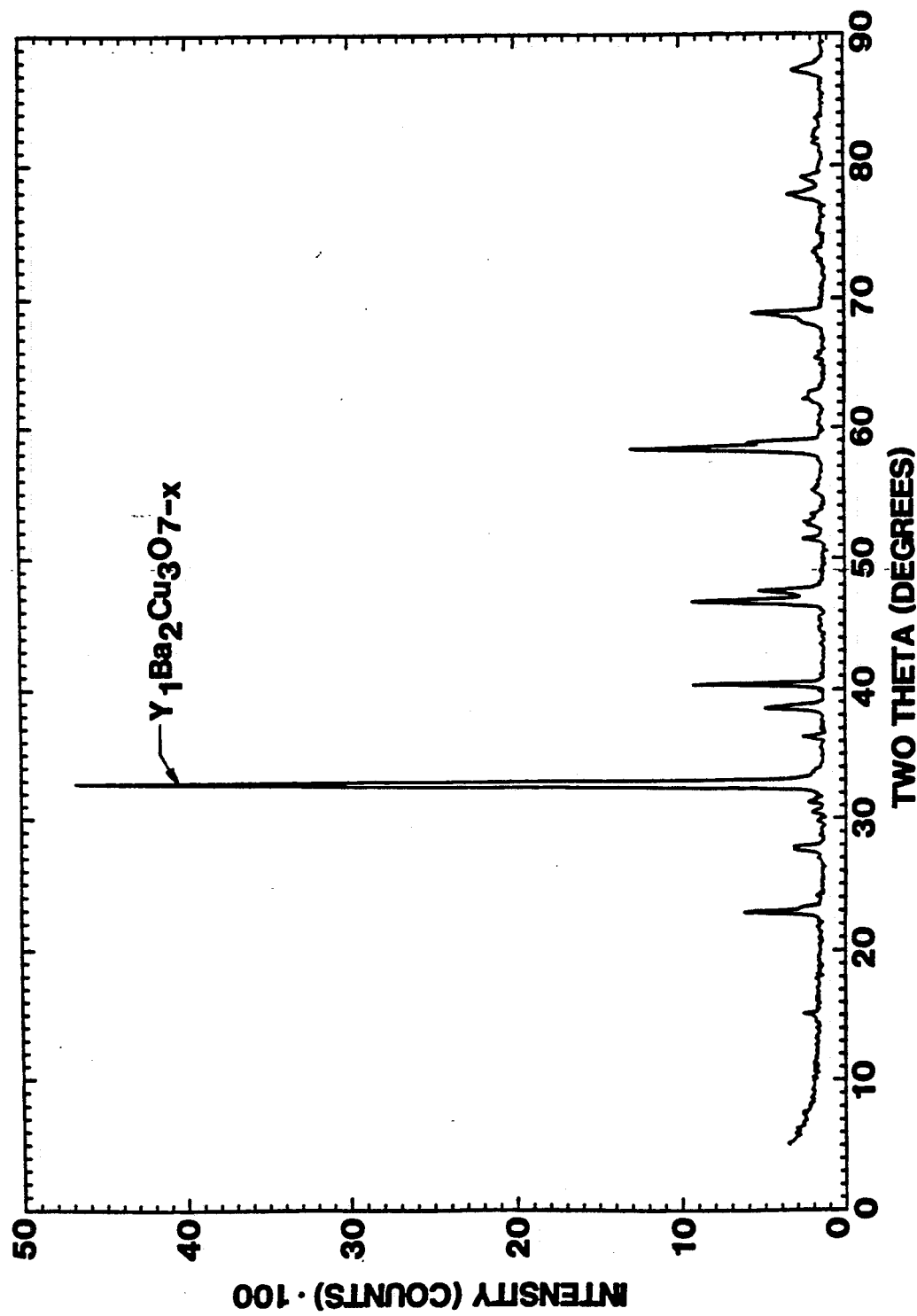
FIG. 5 is a plot of x-ray (XRD) analysis of a precipitate of the invention.
Figure 6:
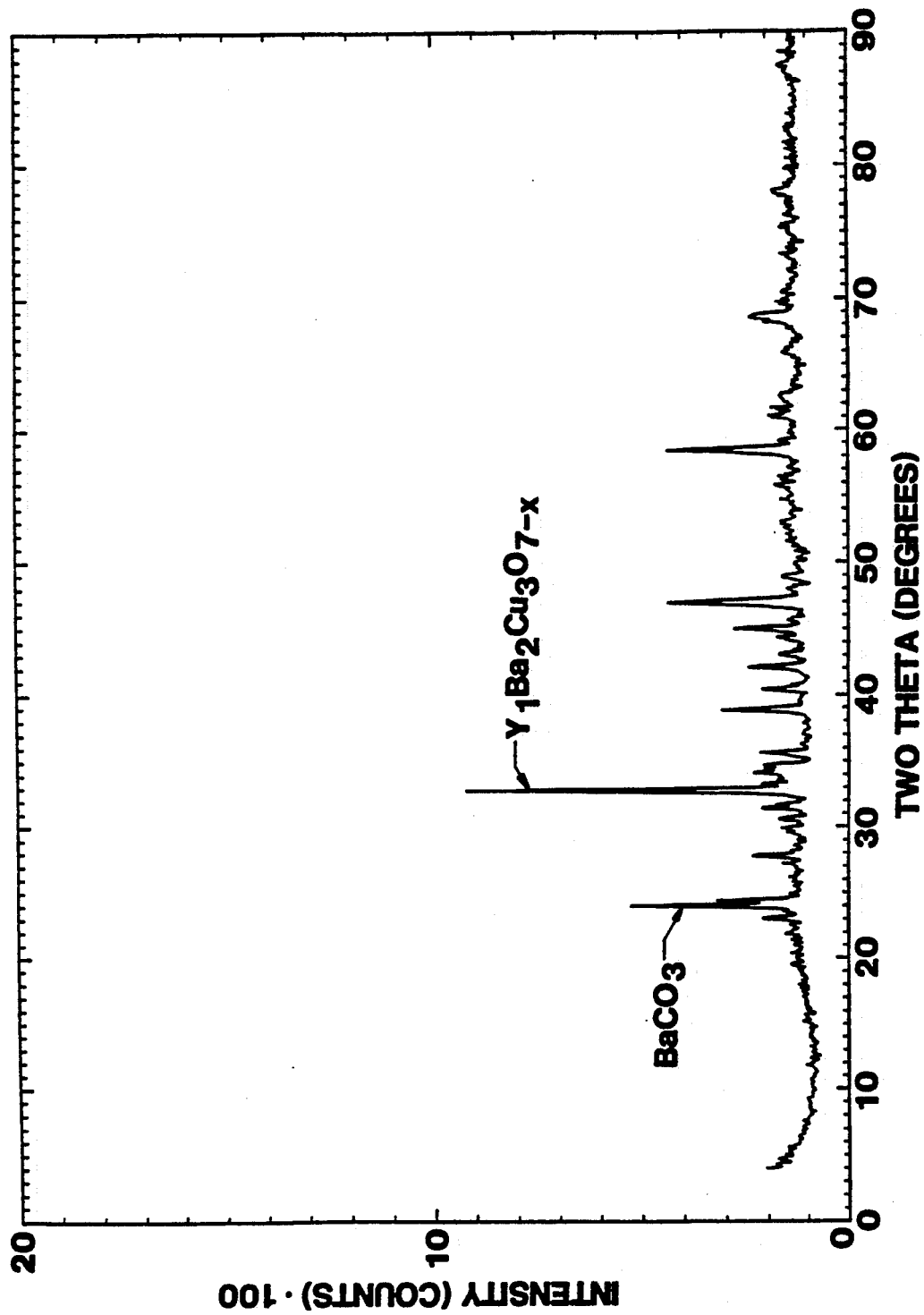
FIG. 6 is an XRD plot of a precipitate of FIG. 2.
Figure 7:
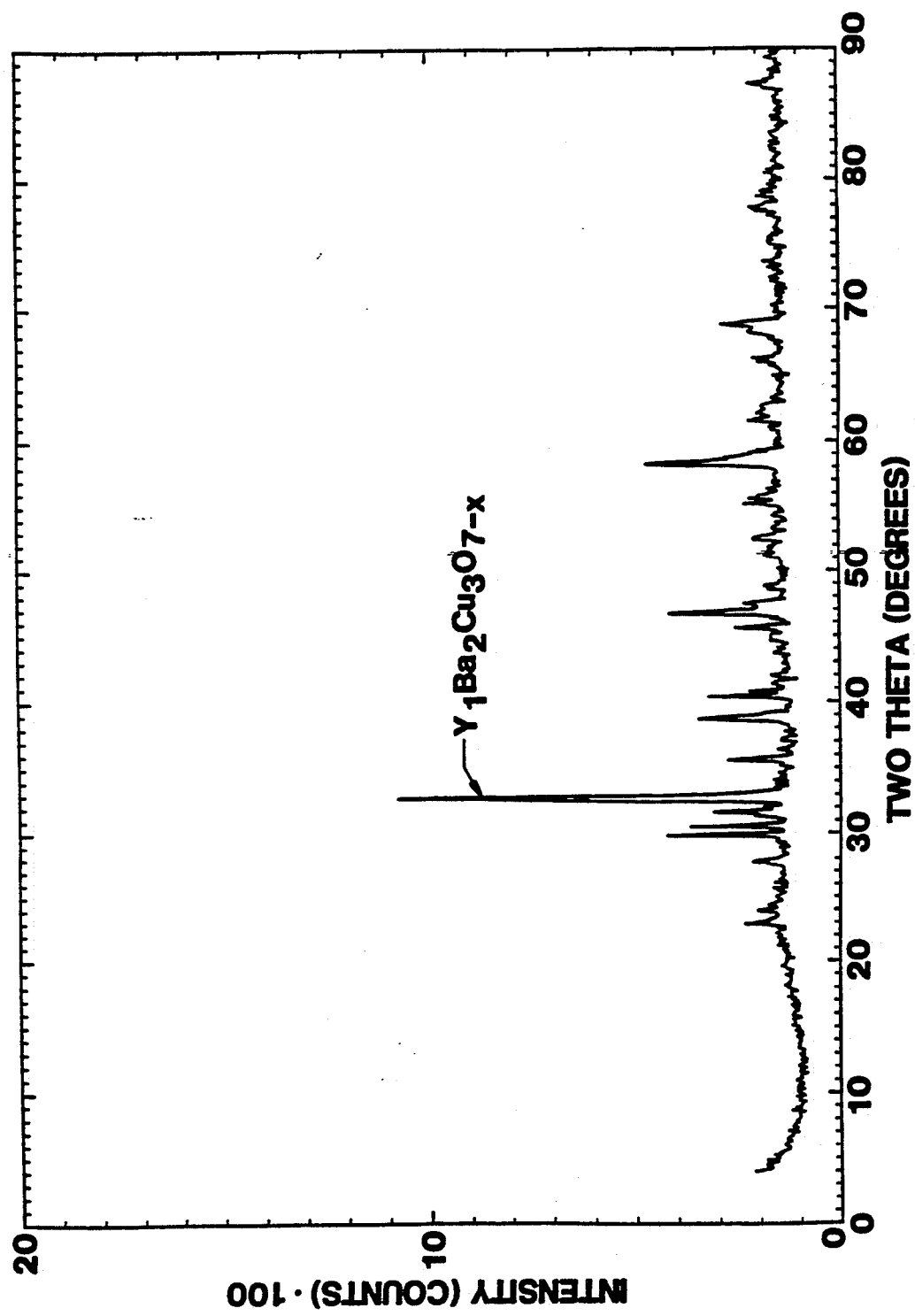
FIG. 7 is an XRD plot of a precipitate of FIG. 3.

The x-ray analysis is shown in FIGS. 5 to 7. The amount of various compounds is indicated by the vertical axis and the response characteristic of such compounds appears on the horizontal axis as noted. It is clear that the amount of the superconducting phase $Y_1Ba_2Cu_3O_{(7-x)}$ is much larger in the mixed metal oxides produced by the methods of the invention (FIG. 5) compared to the same metal oxides when precipitated from aqueous solutions (FIGS. 6 and 7). In addition, it can be seen that the peak associated with barium carbonate has been much reduced, which is believed to indicate that barium is less segregated in the precipitate when prepared by the method of the invention.

I claim:

1. A method for producing a uniform mixed metal oxide comprising:
   (a) dissolving metals as their salts of a carboxylic acid in an aliphatic alcohol in the substantial absence of water, said metals are in the same proportions as in the corresponding mixed metal oxide produced in step(c);

(b) co-precipitating said metals as their oxalates by mixing the alcohol solution of (a) with oxalic acid;

(c) separating the co-precipitated metal oxalates of (b) and calcining said oxalates in air or oxygen above about 500° C. to convert said oxalates to the corresponding metal oxides.

2. The method of claim 1 wherein the metal salts of a carboxylic acid of (a) are metal acetates.

3. The method of claim 2 wherein the aliphatic alcohol is methanol.

4. The method of claim 1 wherein said metals are at least two metals selected from the group consisting of the lanthanides including La, the alkaline earths including Mg, Ca, Sr, Ba, and Ra, the actinides including Ac, and the transition metals including Y, Hg, Pb, Ag, Zn, Al, Cd, Co, Fe, Ni, Pd, Pt, Sc, Au, and Cu.

5. The method of claim 4 wherein said uniform mixed metal oxide has the empirical formula $YBa_2Cu_3O_{7-x}$.

6. The method of claim 4 wherein the metal salts of a carboxylic acid of (a) are metal acetates.

7. The method of claim 4 wherein the aliphatic alcohol is methanol

8. The method of claim 5 wherein the calcining of (c) is carried out at a temperature of about 850° C.

9. The method of claim 1 wherein said oxalic acid is added as a solid.

10. The method of claim 1 wherein said oxalic acid is added in a about stoichiometric amount.

* * * * *